United States Patent
El-Antably et al.

(10) Patent No.: US 8,115,434 B2
(45) Date of Patent: Feb. 14, 2012

(54) HIGH-SPEED SELF-CASCADED ELECTRIC MACHINE

(75) Inventors: Ahmed Mostafa El-Antably, Carmel, IN (US); Robert Dean King, Schenectady, NY (US); Ayman Mohamed Fawzi El-Refaie, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 12/790,349

(22) Filed: May 28, 2010

(65) Prior Publication Data
US 2011/0291599 A1    Dec. 1, 2011

(51) Int. Cl.
*H02P 23/12* (2006.01)

(52) U.S. Cl. ......... 318/400.14; 318/400.12; 318/400.26; 318/400.4

(58) Field of Classification Search ............. 318/400.01, 318/400.12, 400.14, 400.26, 400.37, 400.39, 318/400.4
See application file for complete search history.

(56) References Cited

U.S. PATENT DOCUMENTS

| | | | |
|---|---|---|---|
| 4,066,938 A | | 1/1978 | Turnbull |
| 4,112,339 A | | 9/1978 | Lipo |
| 4,137,489 A | | 1/1979 | Lipo |
| 5,359,272 A | * | 10/1994 | Liao ............................. 318/732 |
| 5,811,905 A | * | 9/1998 | Tang ............................. 310/179 |
| 5,880,550 A | * | 3/1999 | Fukao et al. .................. 310/179 |
| 6,262,550 B1 | | 7/2001 | Kliman et al. |
| 7,388,300 B2 | * | 6/2008 | Anghel et al. ................. 290/39 |
| 7,659,686 B2 | * | 2/2010 | Osada et al. .................. 318/771 |
| 7,723,931 B2 | * | 5/2010 | Dooley ........................ 318/139 |
| 7,872,440 B2 | * | 1/2011 | Atarashi et al. .............. 318/772 |

* cited by examiner

*Primary Examiner* — Bentsu Ro
*Assistant Examiner* — Thai Dinh
(74) *Attorney, Agent, or Firm* — Ziolkowski Patent Solutions Group, SC; Jean K. Testa

(57) ABSTRACT

An electric machine is disclosed comprising a first energy source, a second energy source, and a stator which comprises a first set of windings and a second set of windings. The electric machine has a rotor and a controller, the controller configured to control the first energy source to supply a first current to the first set of windings and control the second energy source to supply a second current to the second set of windings. The controller also detects an angular position of the rotor, detects the first current, detects the second current, and determines an optimum phase shift angle of the first current based on the angular position of the rotor, the first current, and the second current. The controller controls the first energy source based on the optimum phase shift angle to modify the first current supplied to the first set of windings.

21 Claims, 4 Drawing Sheets

HIGH-SPEED SELF-CASCADED ELECTRIC MACHINE

BACKGROUND OF THE INVENTION

Embodiments of the invention relate generally to high-speed electric machines and, more particularly, to a high-speed self-cascaded electric machine having high torque density, high efficiency, and low cost.

The need for high power density and high efficiency electric machines (i.e., electric motors and generators) has long been prevalent for a variety of applications, particularly for hybrid and/or electric vehicle fraction applications. Due to energy supply and environmental reasons, there has been increased motivation to produce hybrid-electric and/or electric vehicles that are both highly efficient and reliable, yet reasonably priced for the average consumer. However, the drive motor technology available for hybrid-electric and electric vehicles has generally been cost-prohibitive, thereby reducing one (or both) of consumer affordability or manufacturer profitability.

Most commercially available hybrid-electric and electric vehicles rely on internal permanent magnet (IPM) electric machines for traction applications, as IPM machines have been found to have high power density and high efficiency over a wide speed range, and are also easily packaged in front-wheel-drive vehicles. However, in order to obtain such high power density, IPM machines must use expensive sintered high energy-product magnets. Furthermore, IPM machines run at high speed (e.g., 14,000 rpm) to obtain optimum power density, and this high speed operation results in a high back electromagnetic field (EMF). Such high back EMF requires the use of high voltage inverter devices, which results in further increases in overall system costs. IPM machines also involve intricate rotor and stator constructions that are sensitive to high speed operation, thereby increasing the complexity and cost of their manufacture. The high costs of manufacturing and maintaining IPM machines have limited both the commercialization of hybrid-electric and electric vehicles and the adoption of electric drive motor technology in general.

In addressing the need for more cost-efficient and low-maintenance hybrid-electric and electric technologies, much effort has been made to develop new battery and inverter technologies. However, as evidenced above, there remains a great need for improved and cost-effective drive motor technologies before hybrid-electric and electric drive technologies become fully commercially viable.

It would therefore be desirable to provide a high-speed self-cascaded electric machine having a high torque density, high efficiency, and relatively low cost.

BRIEF DESCRIPTION OF THE INVENTION

In accordance with one aspect of the invention, an electric machine is provided, the electric machine comprising a first energy source, a second energy source, and a stator, wherein the stator comprises a first set of windings coupled to the first energy source and a second set of windings coupled to the second energy source. The electric machine further comprises a rotor and a controller coupled to the first and second energy sources, wherein the controller is configured to control the first energy source to supply a first current to the first set of windings and control the second energy source to supply a second current to the second set of windings. The controller is also configured to detect an angular position of the rotor, detect the first current on the first set of windings, detect the second current on the second set of windings, and determine an optimum phase shift angle of the first current based on the angular position of the rotor, the detected first current, and the detected second current. The controller controls the first energy source based on the optimum phase shift angle to modify the first current supplied to the first set of windings.

In accordance with another aspect of the invention, a method for exciting an electrical machine having a plurality of windings is disclosed, the method comprising detecting a first current on a first set of stator windings, the first current supplied to the first set of stator windings via an inverter, detecting a second current on a second set of stator windings, and detecting an angular position of a rotor. The method also comprises determining an optimum phase shift angle of the first current based on the detected first current of the first set of stator windings, the detected second current of the second set of stator windings, and the detected angular position of the rotor, and modifying a phase shift angle of the first current based on the determined optimum phase shift angle such that the first current of the inverter supplies the first current with the optimum phase shift angle to the first set of stator windings to generate optimum torque production on the rotor.

In accordance with another aspect of the invention, a motor drive controller for applying current commands to an inverter to control current flow and terminal voltages in an electric machine is disclosed. The motor drive controller is configured to detect an angular position of a rotor, detect a first current on a first set of windings of a stator, and detect a second current on a second set of windings of the stator. The motor drive controller is further configured to determine an optimum phase shift angle of the first current, the optimum phase shift angle being based on the detected angular position of the rotor, the detected first current on the first set of windings, and the detected second current on the second set of windings, and generate an optimum phase shift angle demand based on the determined optimum phase shift angle. The motor drive controller inputs the optimum phase shift angle demand to an inverter coupled to the first set of windings, wherein the inverter is configured to modify the first current on the first set of windings such that an optimum resultant magnetomotive force (MMF) in an air gap between the stator and the rotor is obtained.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
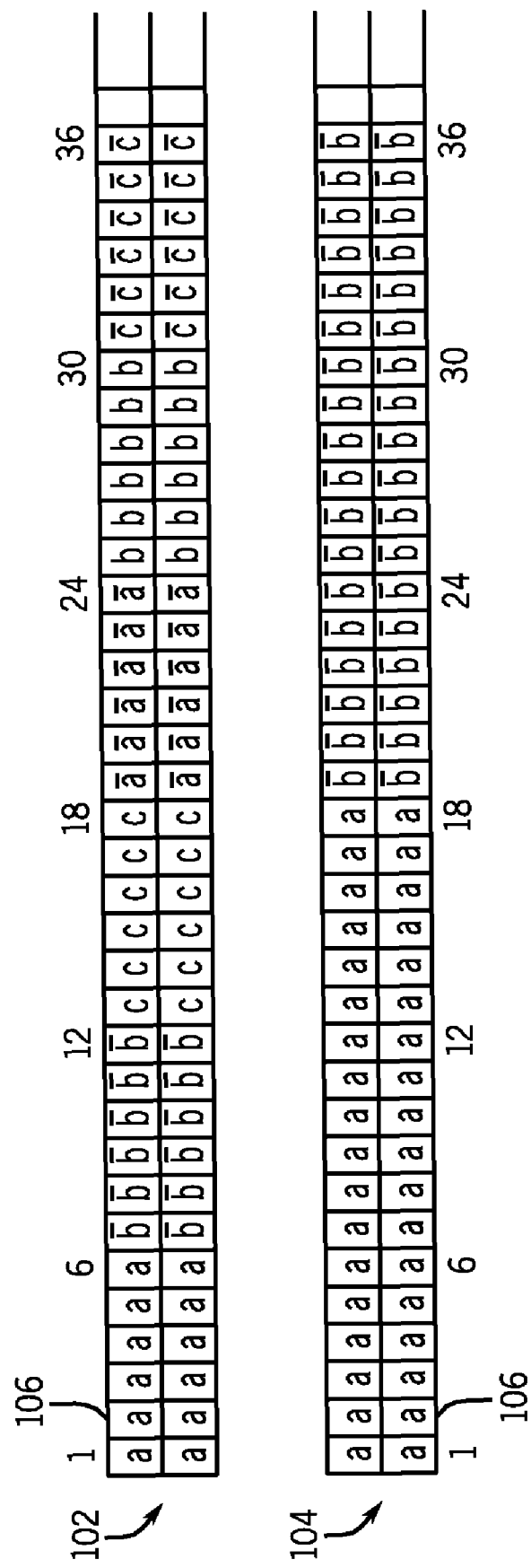
FIG. 1 illustrates a stator winding distribution in accordance with an embodiment of the invention.

A system is shown to provide a high torque density, high efficiency, and relatively low cost electric machine for use in a variety of applications, including electric and hybrid-electric vehicle traction applications.

While many types of electric machines have been utilized for both drive motor and generation applications, the options for high speed applications (such as electric and hybrid-electric vehicle traction applications) have typically been limited by cost and/or performance restraints. As previously noted, many electric and hybrid-electric vehicles utilize internal permanent magnet (IPM) electric machines, which are both costly to produce and risk mechanical failure at high speeds. Embodiments of the invention, however, incorporate a self-cascaded electric machine capable of high speed operation without the cost or performance restraints previously found in the industry.

The self-cascaded electric machine in accordance with embodiments of the invention includes a stator having two sets of windings and a ferromagnetic rotor having no windings, wherein torque is generated on the rotor via magnetic reluctance. The first set of windings has a first pole number P1, while the second set of windings has a second pole number P2 that is less than first pole number P1. The rotor, on the other hand, has salient poles of P3 poles, where:

$$P3=(P1-P2)/2 \quad (1)$$

By configuring the number of salient poles P3 in this way, the rotor may have a low number of poles, while the stator may have a high number of poles. As will be explained in further detail herein, such a difference in pole numbers between the stator and the rotor allows for a significant reduction in the stator back iron, which in turn reduces the overall volume and weight of the electric machine. Savings in volume and weight of the electric machine are particularly useful in applications having tight packaging constraints (e.g., electric and hybrid-electric traction applications).

Until now, the development of high speed self-cascaded electric machines has been hindered by instability problems evident in electric machines having a wide speed range. Such instability is primarily attributable to the interaction between the poles of the stator windings and the poles of the rotor, an interaction that is greatly dependent upon the number of respective poles. Thus, there are particular combinations of pole numbers that should be avoided so as to eliminate instability and improve machine performance. For example, one combination of pole numbers of the respective stator windings that has been found to be particularly problematic is:

$$P2=2 \quad (2)$$

and $$P1 \geq P2+4 \quad (3)$$

If P2=2, it is clear that P1 would equal 6 based on Eqn. 3. In high speed self-cascaded electric machines, the first set of windings having pole number P1 is generally used as the AC winding (which receives AC current), while the second set of windings having pole number P2 is used as the DC winding (which receives DC current). Thus, in the present example, the 6 pole winding is the AC winding, wherein the 6 pole winding is modulated by the 2 pole DC winding to produce a resultant magnetomotive force (MMF) having a dominant 4 pole component. Based on Eqn. 1 above, the rotor would be a 4 pole rotor, and the 4 pole rotor interacts with the dominant 4 pole component of the stator. While such interaction between the poles of the rotor and the poles of the stator will produce torque on the rotor, at medium to large loads, the 2 pole DC winding easily loses symmetry due to the large pole pitch, and this loss of symmetry results in unsymmetrical modulation to the AC signal. Such unsymmetrical modulation may significantly degrade the resultant MMF in the air gap between the stator and the rotor, which in turn results in reduced developed rotor torque, loss of synchronization, and instability.

In order to minimize such instability and reduced torque, embodiments of the invention rely on several limitations to the choice of pole numbers P1 and P2 to enable in the development of efficient self-cascaded electric machines operable over a wide speed range. These limitations are expressed by the following equations:

$$P1 \neq P2 \quad (4)$$

$$P1 \geq P2+8 \quad (5)$$

$$P2 \geq 4 \quad (6)$$

$$P1 \geq 12 \quad (7) \text{ and,}$$

$$(P1-P2)/2 \geq (n+2) \quad (8)$$

where n=2, 4, 6, 8, . . . . By adhering to the pole number limitations expressed above with respect to Eqn. 4-Eqn. 8, the instability and reduced rotor torque generated by using pole numbers in accordance with Eqn. 2 and Eqn. 3 can be avoided, thereby enhancing the performance of the high speed self-cascaded electric machine of the invention.

FIG. 1 illustrates a stator winding distribution in accordance with an embodiment of the invention. The conventional frame and magnetic material of the stator are not shown in FIG. 1. Stator winding 102 is a 12 pole winding (P1=12), which may be used as an AC winding. The slots-per-pole-per-phase (S/P/P) of the 12 pole winding is equal to 2, wherein the total number of slots 106 is 72 (although more or fewer slots 106 can be utilized). While FIG. 1 shows only 36 total slots 106, it is to be understood that the winding distributions are symmetrical, and thus only 36 of the 72 slots 106 are shown for simplicity of illustration. Stator winding 104, on the other hand, is a 4 pole winding (P2=4) having an S/P/P of 6, and is utilized as a DC winding. While not shown in FIG. 1, it is to be understood that stator winding 102 and stator winding 104 each receive power, which is supplied independently to each respective stator winding.

Figure 2:
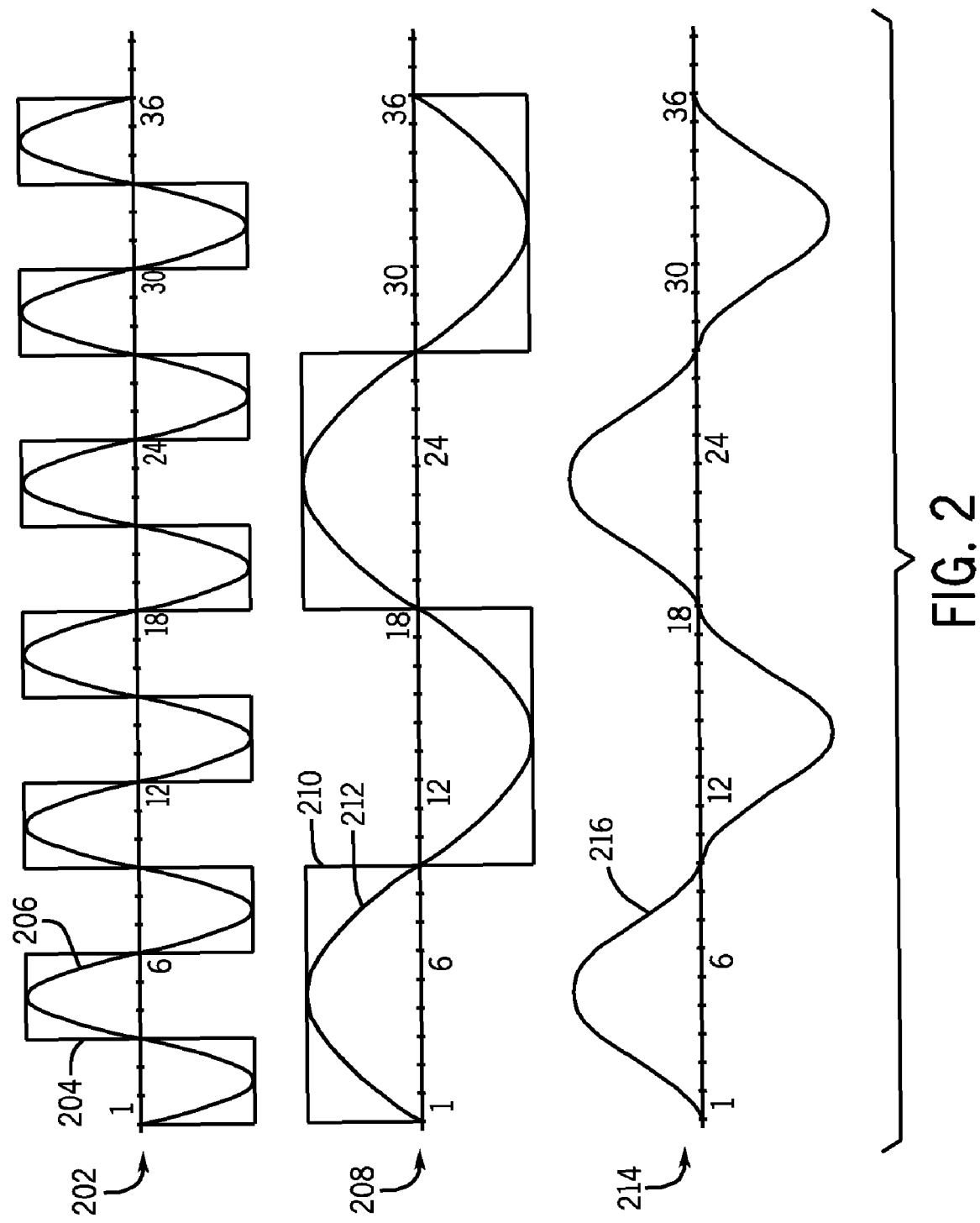
FIG. 2 illustrates a first stator winding MMF, a second stator winding MMF, and a resultant MMF based on the stator winding distribution shown in FIG. 1.

Using the stator winding configuration as shown in FIG. 1, where stator winding 102 is an AC winding and stator winding 104 is a DC winding, the AC current on stator winding 102 has a phase shift of 180 electrical degrees from the DC current on stator winding 104 when no load is applied to the rotor shaft. FIG. 2 illustrates a graphical representation of the winding MMF for both winding 102 and winding 104 under such "no load" conditions at a given instant in time. Graph 202 represents the MMF waveform of stator winding 102, which is the 12-pole AC winding. Square waveform 204 shows the ideal MMF waveform of the stator winding 102, while waveform 206 represents the fundamental (or actual) MMF waveform of stator winding 102 at no load. Similarly, graph 208 represents the MMF waveform of stator winding 104, which is the 4-pole DC winding. Square waveform 210 is the ideal MMF waveform of the DC winding in this instance, and waveform 212 is the fundamental MMF waveform of stator winding 104.

As both the AC winding (stator winding 102) and the DC winding (stator winding 104) are simultaneously powered, the total MMF distribution in the air gap between the stator and the rotor corresponds to the sum of the MMFs produced by stator winding 102 and stator winding 104. Graph 214 of FIG. 2 illustrates this resultant air gap MMF, wherein waveform 216 represents the resultant air gap MMF at no load. The strong resultant 4-pole MMF shown by graph 214 interacts with the rotor poles to produce a high shaft torque at no load.

While FIG. 2 shows a strong resultant MMF that generates a high shaft torque on the rotor at no load, the 180 electrical degree phase shift of the AC current (corresponding to the current on stator winding 102) from the DC current (corresponding to the current on stator winding 104) will not be adequate to produce a strong resultant MMF in the air gap when a load is applied to the rotor shaft. Thus, it important for the phase shift angle of the AC current to be adjustable so as to maintain the strong resultant air gap MMF at varying loads in order to maximize performance and guarantee stability of the high speed self-cascaded machine.

Figure 3:
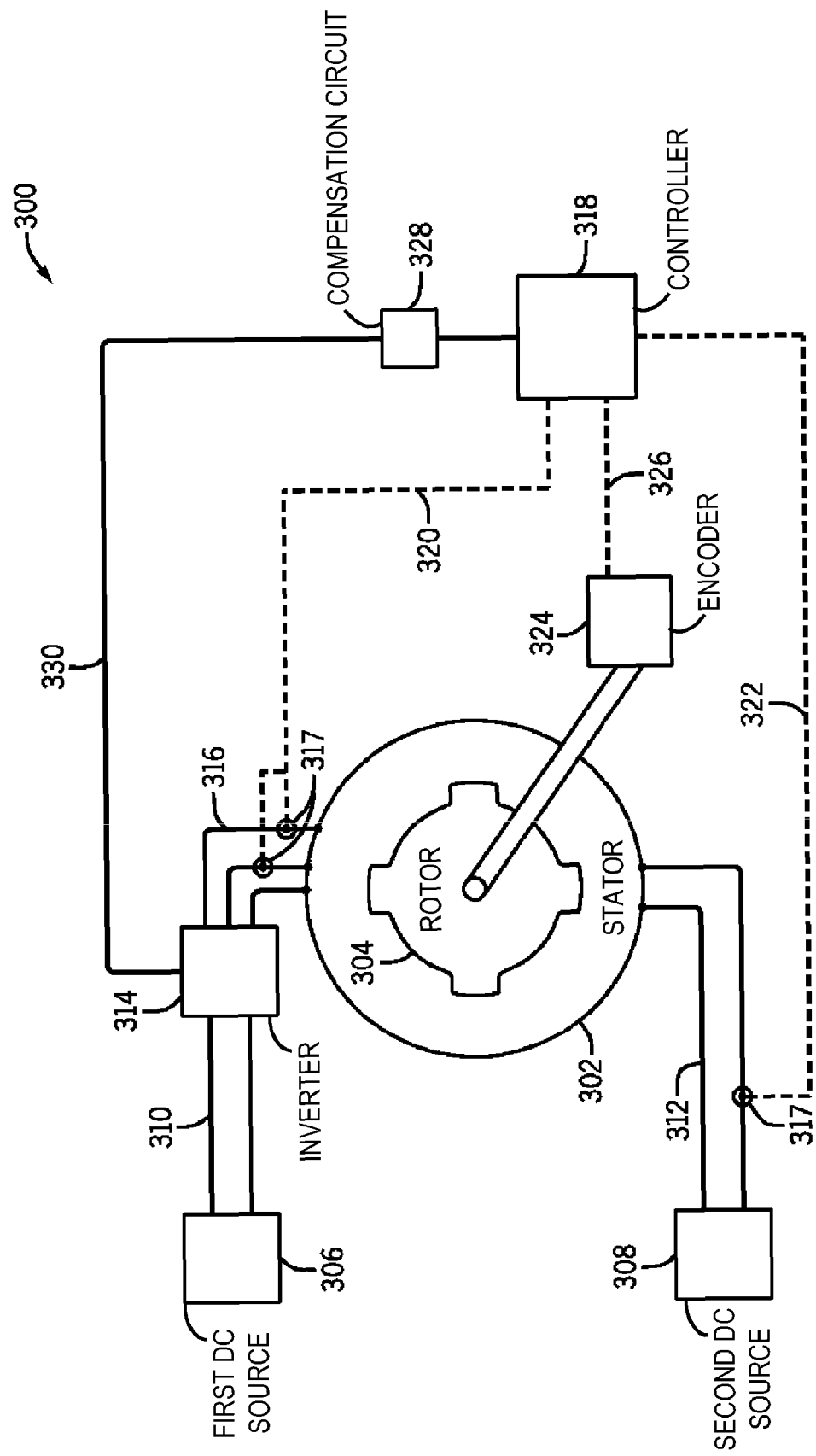
FIG. 3 is a schematic diagram showing a self-cascaded electric machine in accordance with an embodiment of the present invention.

Referring now to FIG. 3, a system 300 is shown, wherein system 300 is configured to optimize the performance and stability of the high speed self-cascaded machine. System 300 comprises a stator 302 and a salient pole rotor 304. While rotor 304 is shown as a salient pole rotor in FIG. 3, it is to be understood that rotor 304 could be of any suitable configuration (e.g., round). While not shown in FIG. 3, it is to be understood that stator 302 comprises two sets of windings having different pole numbers, as discussed above with respect to FIGS. 1 and 2. A first DC power source 306 provides power for the first set of stator windings via DC link 310, while a second DC power source 308 outputs DC current to the second set of stator windings via DC link 312. DC link 310 is coupled to an inverter 314, which converts the DC current from DC link 310 into AC current. The AC current is then output from inverter 314 to the first set of stator windings via lines 316. Thus, the first set of stator windings are AC windings, while the second set of stator windings are DC windings.

System 300 also comprises a controller 318, wherein controller 318 is configured to ensure that an optimum resultant MMF is present in the air gap between stator 302 and rotor 304 at a given shaft load. To do so, controller 318 receives a current signal from AC lines 316 via line 320 and a current signal from DC lines 312 via line 322. The current on AC lines 316 is preferably detected via current sensors 317 on two of the three AC lines 316. One or more current sensors 317 may also be used to detect the current on DC lines 312. Controller 316 is also coupled to a shaft position encoder 324 via line 326, wherein shaft position encoder 324 is configured to measure the angular rotor position. Alternatively, the angular rotor position may be determined by a resolver positioned on the rotor shaft.

Based on the detected AC current, the detected DC current, and the detected angular rotor position, controller 318 determines an optimum AC current phase shift angle relative to the DC current. The optimum phase shift angle is chosen from a plurality of optimum phase shift angle profiles stored in a lookup table, the lookup table preferably being stored on a computer-readable storage medium located within controller 318. After an optimum phase shift angle for the given AC current, DC current, and angular rotor position is selected, the optimum phase shift angle is sent from controller 318 to inverter 314 via line 330. A compensation circuit 328, which may include a lead/lag circuit, is located in-line between controller 318 and inverter 314 so as to compensate for any varying gains and time lags, which stabilizes the signals sent to inverter 314. In this way, inverter 314 is able to produce an AC current having the determined optimum phase shift angle relative to the DC current, which in turn results in an optimum resultant MMF in the air gap between stator 302 and rotor 304.

Under the configuration described above with respect to FIG. 3, system 300 is capable of providing optimum torque production on the rotor shaft at continuously varying loads and speeds, and stable operation of the self-cascaded electric machine is maintained over a wide speed range. As such, an electric machine having high torque density, high efficiency, and relatively low cost is obtained.

Figure 4:
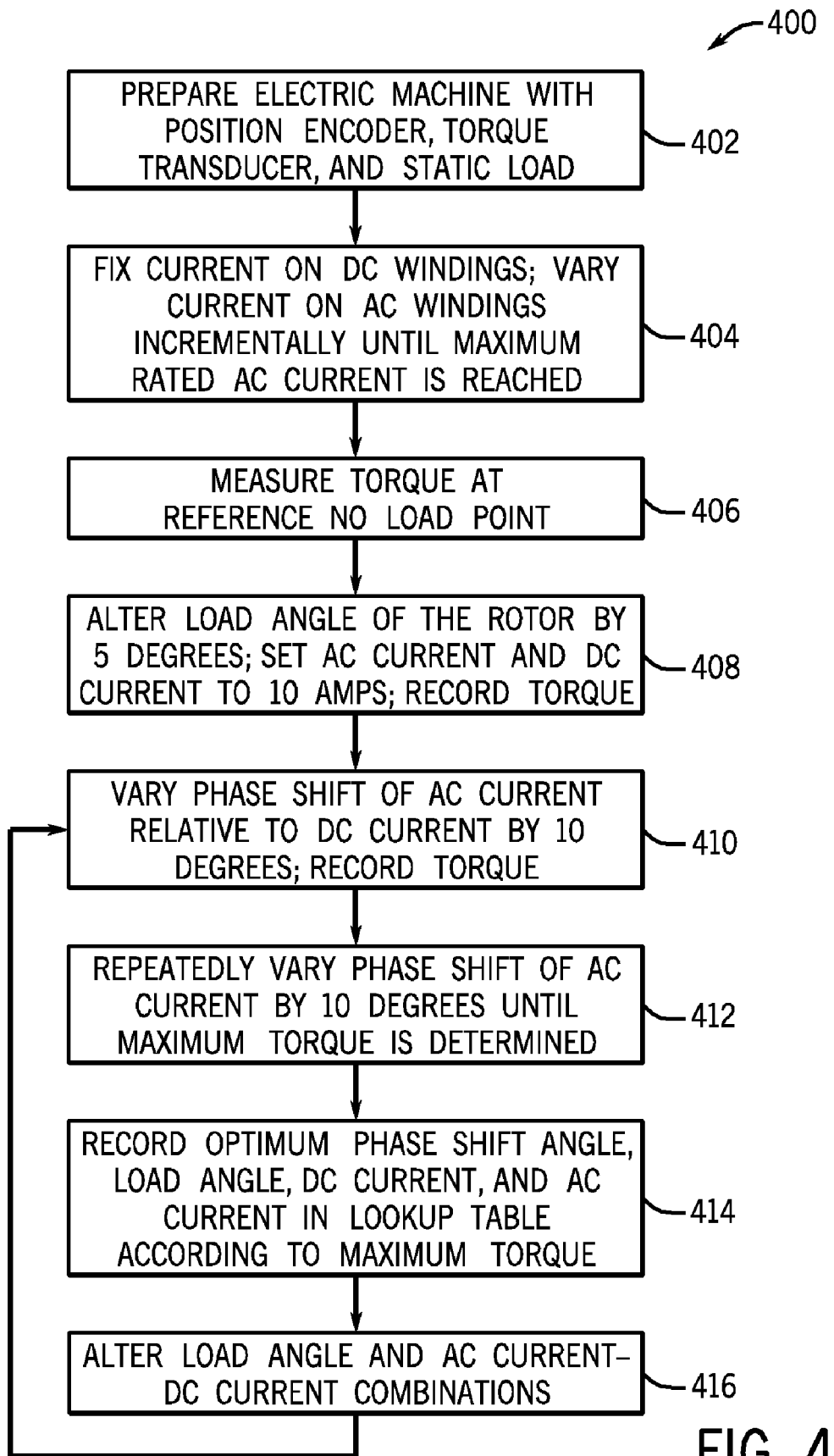
FIG. 4 is a flowchart diagram showing a method of determining optimum phase shift angles in accordance with an embodiment of the invention.

In order to determine the plurality of optimum phase shift angle profiles to be stored in the aforementioned lookup table, one embodiment of the invention involves carrying out a plurality of static measurements at varying operating parameters. FIG. 4 sets forth a method 400 used in executing this optimum phase shift angle determination. At step 402, the self-cascaded electric machine is prepared with a shaft position encoder, a torque transducer, and a static load, wherein the static load is capable of producing the fully rated torque of the system. Next, at step 404, the DC current fed to the DC windings is fixed at, for example, 10 Amps, while the current supplied to the AC windings is varied from 10 Amps in equal increments (e.g., increments of 10) until 100% of the maximum rated AC current is reached. At step 406, the measurements are initiated with the phase shift angle between the AC current and DC field current being 180 electrical degrees at zero load angle of the rotor. This measurement is considered the reference "no load point".

Next, at step 408, the load angle is set to 5 degrees, the current supplied to the AC windings is set to 10 Amps, the current supplied to the DC windings is also set to 10 Amps, and the torque is recorded. The phase shift of the AC current relative to the DC current is then varied in increments of 10 degrees at step 410, with the torque recorded at each 10 degree increment. This process is repeated for various phase shift angles until maximum torque is determined at step 412. Once the maximum torque is determined from these static measurements, the optimum phase shift angle, the load angle, the DC current, and the AC current are recorded in the lookup table at step 414. These values represent a point in the lookup table representing the optimum phase shift angle profile that is needed to achieve the highest torque at a given load angle and given DC and AC currents.

After the optimum phase shift angle profile is determined for a given load angle and given DC and AC currents, different load angles and different AC current—DC current combinations are selected at step 416, and the process set forth above with respect to steps 410-414 is repeated until all optimum phase shift angles are determined and stored in the lookup table. While the above determinations of the optimum phase shift angles are done using a plurality of initial static measurements, it is also envisioned that finite element analysis or automatic determination of the optimum phase shift angles for a given load angle, AC current, and DC current could also be used.

By utilizing the above embodiments of the invention, a high torque density, high efficiency, and low cost electric machine can be realized. Additionally, the passive rotor of the system, which lacks rotor windings, is simply constructed and insensitive to high speed (e.g., 10,000 rpm) environments, which is particularly important in electric and hybrid-electric vehicle applications. Furthermore, the synchronous reluctance operation of the electric machine obviates the need for brushes and/or slip rings, which often pose reliability issues in many electric machines. Also, as previously noted, the high pole number of the stator windings allows for a significant reduction in the stator back iron, which reduces the overall volume and weight of the self-cascaded electric machine, thus making the self-cascaded electric machine more suitable for applications that require tight packaging situations (e.g., electric and hybrid-electric traction applications).

A technical contribution for the disclosed method and apparatus is that it provides for a computer implemented technique for controlling a high-speed self-cascaded electric machine so as to provide an electric machine having high torque density, high efficiency, and low cost.

Therefore, according to one embodiment of the invention, an electric machine is provided, the electric machine comprising a first energy source, a second energy source, and a stator, wherein the stator comprises a first set of windings coupled to the first energy source and a second set of windings coupled to the second energy source. The electric machine further comprises a rotor and a controller coupled to the first and second energy sources, wherein the controller is configured to control the first energy source to supply a first current to the first set of windings and control the second energy source to supply a second current to the second set of windings. The controller is also configured to detect an angular position of the rotor, detect the first current on the first set of windings, detect the second current on the second set of windings, and determine an optimum phase shift angle of the first current based on the angular position of the rotor, the detected first current, and the detected second current. The controller controls the first energy source based on the optimum phase shift angle to modify the first current supplied to the first set of windings.

According to another embodiment of the invention, a method for exciting an electrical machine having a plurality of windings is disclosed, the method comprising detecting a first current on a first set of stator windings, the first current supplied to the first set of stator windings via an inverter, detecting a second current on a second set of stator windings, and detecting an angular position of a rotor. The method also comprises determining an optimum phase shift angle of the first current based on the detected first current of the first set of stator windings, the detected second current of the second set of stator windings, and the detected angular position of the rotor, and modifying a phase shift angle of the first current based on the determined optimum phase shift angle such that the first current of the inverter supplies the first current with the optimum phase shift angle to the first set of stator windings to generate optimum torque production on the rotor.

According to yet another embodiment of the invention, a motor drive controller for applying current commands to an inverter to control current flow and terminal voltages in an electric machine is disclosed. The motor drive controller is configured to detect an angular position of a rotor, detect a first current on a first set of windings of a stator, and detect a second current on a second set of windings of the stator. The motor drive controller is further configured to determine an optimum phase shift angle of the first current, the optimum phase shift angle being based on the detected angular position of the rotor, the detected first current on the first set of windings, and the detected second current on the second set of windings, and generate an optimum phase shift angle demand based on the determined optimum phase shift angle. The motor drive controller inputs the optimum phase shift angle demand to an inverter coupled to the first set of windings, wherein the inverter is configured to modify the first current on the first set of windings such that an optimum resultant magnetomotive force (MMF) in an air gap between the stator and the rotor is obtained.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric machine comprising:
   a first energy source;
   a second energy source;
   a stator, wherein the stator comprises:
      a first set of windings comprising AC field windings that are coupled to the first energy source; and
      a second set of windings comprising DC field windings that are coupled to the second energy source;
   a rotor; and
   a controller coupled to the first and second energy sources and configured to:
      control the first energy source to supply a first current to the first set of windings;
      control the second energy source to supply a second current to the second set of windings;
      detect an angular position of the rotor;
      detect the first current on the first set of windings;
      detect the second current on the second set of windings;
      determine an optimum phase shift angle of the first current relative to the second current that causes a corresponding maximum amount of torque to be generated on the rotor from the supplied first and second currents, the optimum phase shift angle of the first current being determined based on the angular position of the rotor, the detected first current, and the detected second current; and
      control the first energy source based on the optimum phase shift angle to modify the first current supplied to the first set of windings.

2. The electric machine of claim 1 further comprising a shaft encoder coupled to the controller, wherein the shaft encoder is configured to detect the angular position of the rotor.

3. The electric machine of claim 1 wherein the first set of windings has a first number of poles (P1) and the second set of windings has a second number of poles (P2), wherein the second number of poles (P2) is less than the first number of poles (P1).

4. The electric machine of claim 3 wherein the rotor comprises salient poles free of windings, wherein the salient poles (P3) are determined by the equation:

$$P3=(P1-P2)/2.$$

5. The electric machine of claim 3 wherein:

$$P2 \geq 4; \text{ and}$$

$$P1 \geq 12.$$

6. The electric machine of claim 1 further comprising an inverter coupled to the first set of windings, the inverter configured to deliver the first current to the first set of windings.

7. The electric machine of claim 6 further comprising a compensation circuit coupled between the controller and the inverter, wherein the compensation circuit comprises a lead/lag circuit configured to compensate for varying gains and time lags of signals between the controller and the inverter.

8. The electric machine of claim 1 wherein the controller comprises a computer-readable storage medium therein, the computer-readable storage medium configured to store a plurality of optimum phase shift angle profiles thereon.

9. The electric machine of claim 8 wherein the controller is configured to select an optimum phase shift angle profile from the plurality of optimum phase shift angle profiles based on the angular position of the rotor, the detected first current of the first set of windings, and the detected second current of the second set of windings.

10. The electric machine of claim 1 wherein the rotor is one of a salient pole rotor and a round rotor.

11. A method for exciting an electrical machine having a plurality of windings, the method comprising:
    detecting a first current on a first set of stator windings, the first current supplied to the first set of stator windings via an inverter;
    detecting a second current on a second set of stator windings;
    detecting an angular position of a rotor;
    determining an optimum phase shift angle of the first current that would cause a corresponding maximum amount of torque to be generated on the rotor from the provided first and second currents, the optimum phase shift angle being determined based on the detected first current of the first set of stator windings, the detected second current of the second set of stator windings, and the detected angular position of the rotor; and
    modifying a phase shift angle of the first current based on the determined optimum phase shift angle such that the first current of the inverter supplies the first current with the optimum phase shift angle to the first set of stator windings so as to generate the maximum torque on the rotor;
    wherein determining the optimum phase shift angle comprises accessing a lookup table having stored thereon a plurality of optimum phase shift angles in relation to the first current of the first set of stator windings, the second current of the second set of stator windings, and the angular position of the rotor.

12. The method of claim 11 wherein the plurality of optimum phase shift angles stored on the lookup table are determined via a plurality of static measurements, wherein the plurality of static measurements enable the determination maximum torque on the rotor at varying loads, varying currents on the first and second sets of stator windings, and varying angular positions of the rotor.

13. The method of claim 11 further comprising selecting a number of salient poles of the rotor (P3) based on a number of poles of the first winding (P1) and a number of poles of the second winding (P2), wherein P3=(P1−P2)/2.

14. A motor drive controller for applying current commands to an inverter to control current flow and terminal voltages in an electric machine, the motor drive controller configured to:
    detect an angular position of a rotor;
    detect a first current on a first set of windings of a stator, the first set of windings comprising AC field windings;
    detect a second current on a second set of windings of the stator, the second set of windings comprising DC field windings;
    determine an optimum phase shift angle of the first current that would cause a corresponding maximum amount of torque to be generated on the rotor from the first and second currents, the optimum phase shift angle being based on the detected angular position of the rotor, the detected first current on the first set of windings, and the detected second current on the second set of windings;
    generate an optimum phase shift angle demand based on the determined optimum phase shift angle; and
    input the optimum phase shift angle demand to an inverter coupled to the first set of windings, wherein the inverter is configured to modify the phase shift angle of the first current, relative to the second current, on the first set of windings such that the maximum amount of torque on the rotor is obtained.

15. The motor drive controller of claim 14 wherein the motor drive controller is coupled to at least one of a shaft encoder and a resolver to determine the angular position of the rotor.

16. The motor drive controller of claim 14 wherein motor drive controller is coupled to current sensors configured to detect the first current on the first set of windings and the second current of the second set of windings.

17. The motor drive controller of claim 14 further comprising a computer-readable storage medium stored therein, the computer-readable storage medium having stored thereon a plurality of optimum phase shift angle profiles, wherein the optimum phase shift angle profiles are based on the angular position of the rotor, the first current of the first set of windings, and the second current of the second set of windings.

18. The motor drive controller of claim 14 wherein the motor drive controller is configured to detect an average AC current on the first set of windings and a DC current on the second set of windings.

19. The motor drive controller of claim 14 wherein the motor drive controller is coupled to a compensation circuit configured to compensate for varying gains and time lags of signals between the motor drive controller and the inverter.

20. An electric machine comprising:
    a first energy source;
    a second energy source;
    a stator, wherein the stator comprises:
        a first set of windings coupled to the first energy source; and
        a second set of windings coupled to the second energy source;
    a rotor; and
    a controller coupled to the first and second energy sources and configured to:
        control the first energy source to supply a first current to the first set of windings;
        control the second energy source to supply a second current to the second set of windings;
        detect an angular position of the rotor;
        detect the first current on the first set of windings;
        detect the second current on the second set of windings;
        determine an optimum phase shift angle of the first current relative to the second current that causes a corresponding maximum amount of torque to be generated on the rotor from the supplied first and second currents, the optimum phase shift angle of the first current being determined based on the angular position of the rotor, the detected first current, and the detected second current; and
        control the first energy source based on the optimum phase shift angle to modify the first current supplied to the first set of windings;
    wherein the first set of windings has a first number of poles (P1) and the second set of windings has a second number of poles (P2), wherein the second number of poles (P2) is less than the first number of poles (P1); and
    wherein the rotor comprises salient poles free of windings, wherein the salient poles (P3) are determined by the equation:

$$P3=(P1-P2)/2.$$

21. An electric machine comprising:
a first energy source;
a second energy source;
a stator, wherein the stator comprises:
- a first set of windings coupled to the first energy source; and
- a second set of windings coupled to the second energy source;

a rotor;
a controller coupled to the first and second energy sources and configured to:
- control the first energy source to supply a first current to the first set of windings;
- control the second energy source to supply a second current to the second set of windings;
- detect an angular position of the rotor;
- detect the first current on the first set of windings;
- detect the second current on the second set of windings;
- determine an optimum phase shift angle of the first current relative to the second current that causes a corresponding maximum amount of torque to be generated on the rotor from the supplied first and second currents, the optimum phase shift angle of the first current being determined based on the angular position of the rotor, the detected first current, and the detected second current; and
- control the first energy source based on the optimum phase shift angle to modify the first current supplied to the first set of windings;

an inverter coupled to the first set of windings, the inverter configured to deliver the first current to the first set of windings; and
a compensation circuit coupled between the controller and the inverter, wherein the compensation circuit comprises a lead/lag circuit configured to compensate for varying gains and time lags of signals between the controller and the inverter.

* * * * *